Dec. 27, 1955  G. S. TROBERG  2,728,332
MEANS FOR CHANGING THE CUBICAL CONTENTS OF THE COMBUSTION
CHAMBERS OF AN INTERNAL COMBUSTION ENGINE
Filed Dec. 26, 1952  3 Sheets-Sheet 1

GEORGE S. TROBERG
INVENTOR

BY
Smith & Tuck

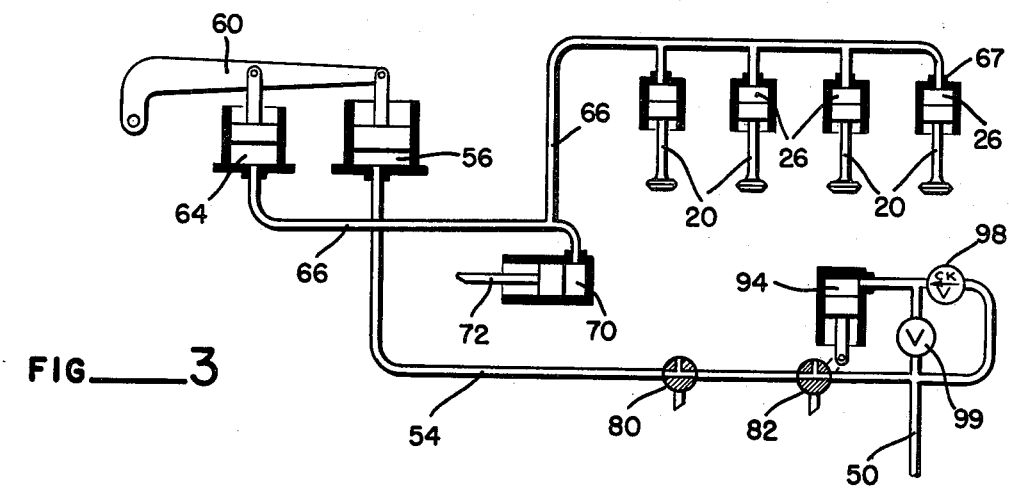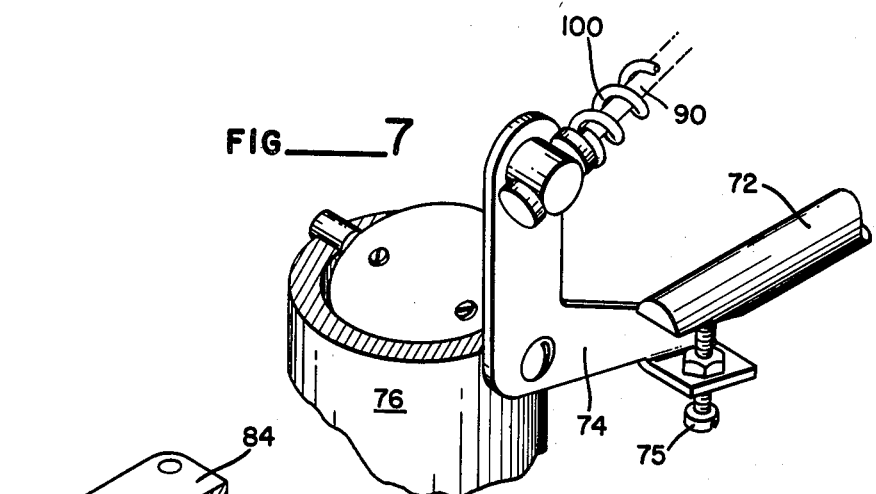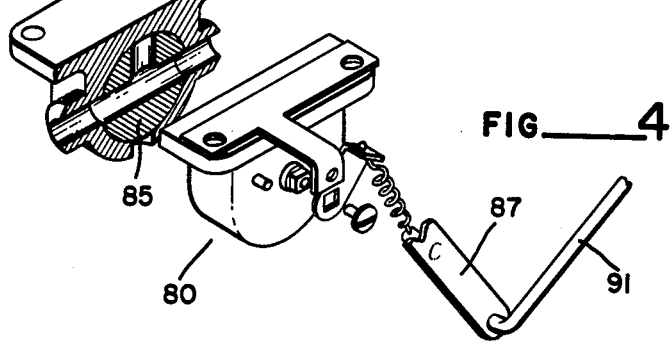

Dec. 27, 1955 G. S. TROBERG 2,728,332
MEANS FOR CHANGING THE CUBICAL CONTENTS OF THE COMBUSTION
CHAMBERS OF AN INTERNAL COMBUSTION ENGINE
Filed Dec. 26, 1952 3 Sheets-Sheet 3
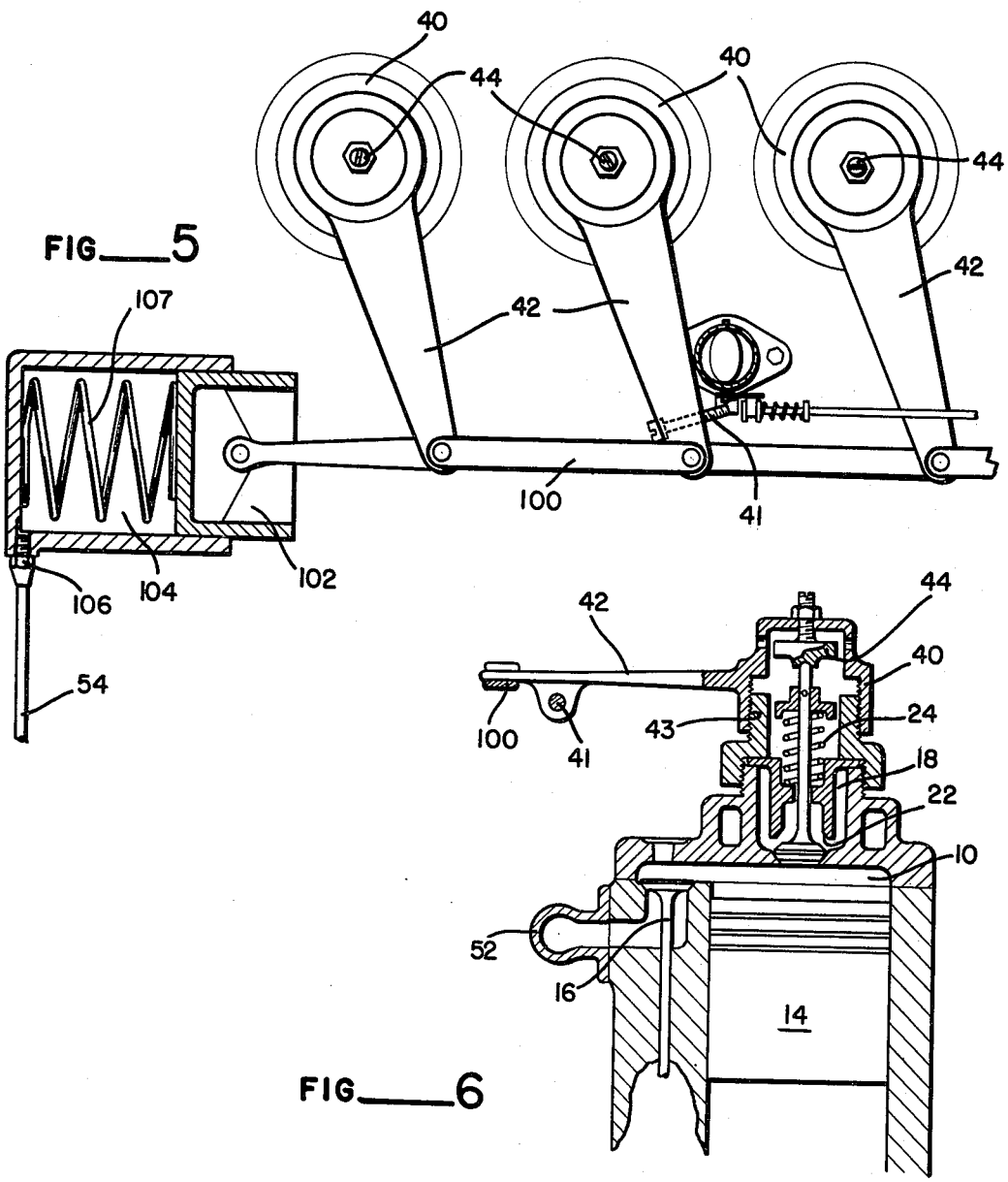
GEORGE S. TROBERG
INVENTOR
BY
*Smith & Tuck*

United States Patent Office 2,728,332
Patented Dec. 27, 1955

2,728,332

MEANS FOR CHANGING THE CUBICAL CONTENTS OF THE COMBUSTION CHAMBERS OF AN INTERNAL COMBUSTION ENGINE

George S. Troberg, Seattle, Wash.

Application December 26, 1952, Serial No. 327,960

9 Claims. (Cl. 123—48)

This present invention relates to that general class of devices which are intended to generally maintain a safe and efficient compression pressure in the cylinders of an internal combustion engine and more particularly this invention relates to control means which will operate to increase the cubical contents of the combustion chamber under or near open throttle conditions and thus promote the highest practical thermal efficiency in the motor under full load conditions and will operate to decrease the cubical contents under or near closed throttle conditions. Such control means is arranged to operate preferably automatically, and to be so interlocked with the normal throttle control means for the engine that it will serve its intended purpose but definitely assure that dangerously high pressures cannot be achieved.

The prime mover for our automotive equipment probably encounters the most severe operating conditions of all internal combustion motors in that its load varies, from the maximum output of the motor, to the other extreme where the vehicle may be driving the motor, as when using the compression of the engine to assist in braking on hills. In normal driving, only a fractional part of the capacity of the motor is needed, yet the motor must be capable, on demand, of giving the maximum required. These operational requirements are further aggravated by the fact that a wide range of motor speeds is also a prime requirement for automotive service and the designer of such power plants must of necessity merely strike a predetermined mean which will only show high thermal efficiency when that one set of conditions is present, usually the full load condition. Many designers of engines have endeavored to correct this condition by making the combustion chamber variable in size and no doubt when under the control of a well-informed user, such devices will achieve their intended purpose. It is however beyond the realm of practicability to endeavor to educate adequately the millions of drivers of motor vehicles to use a device that requires their complete understanding of the motor and then to manually make the adjustments which those principles require. This present invention is believed to supply a practical means for controlling the cubical content of the combustion chamber and automatically change it to the most efficient thermal requirements.

The principal object of this present invention therefore is to provide a comparatively inexpensive means for obtaining a high compression pressure when low vacuum pressures are prevalent in the intake manifold of an internal combustion engine and to make the employment of these principles automatic in their operation.

A further object of this invention is to provide means for the attainment of higher compression pressures, when needed to maintain high thermal efficiency in the motor, and to assure the safe use of this capability by providing interlocking means which will prevent excess compression pressures which might result in dangerous combustion pressures or detonations.

A further object of this invention is to provide means for achieving these purposes which do not call for the extremely fine tolerances in the machining of the metal parts and, because of its construction, this mechanism does not present any lubrication difficulties so prevalent when an adjustable piston arrangement is employed to vary the size of the combustion chamber.

A further object of this invention is to provide means which in the event of failure of any of the component parts will leave those parts in a safe condition so that the motor can be safely continued in operation with only a reduction in its thermal efficiency.

A final object of this invention is to provide a practical means for the achievement of a higher thermal efficiency with its resultant lower fuel consumption by means which are automatic in their operation and involve delay timing means so the operation will occur only after gear-shifting and the like have been completed.

Further objects, advantages and capabilities will be apparent from the description and disclosure in the drawings, or may be comprehended or are inherent in the device.

In the drawings:

Figure 3 is a diagrammatic view, illustrating the valve means employed to change the volume of the combustion chamber together with the associated hydraulic operating means and the valving means used to interlock the same into the operational control means of the motor;

Figure 4 is a perspective view, showing in exploded relationship, and partly in section, my fluid pressure control valve;

Figure 5 is a diagrammatic top plan view, partly in section, illustrating how the fluid pressure line can be mechanically connected to the valve means employed in my device;

Figure 6 is a typical cross-sectional view, in elevation, similar to Figure 2, but illustrating the mechanical means which may be substituted for the fluid pressure means in the final application of my control means; and Figure 7 is an enlarged view of one preferred form of interlock device used to insure against premature opening of the throttle.

Figure 1:
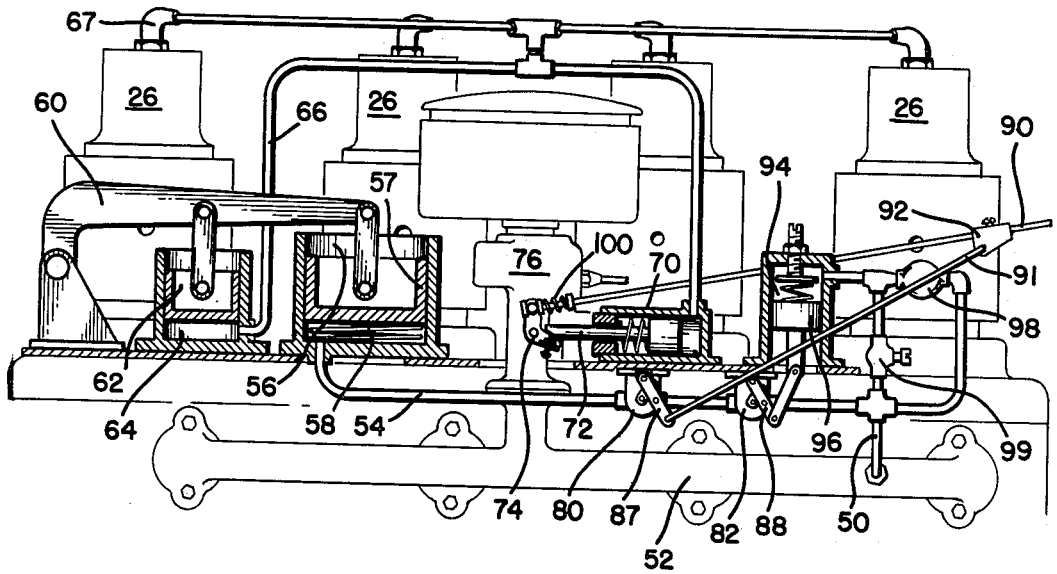
Figure 1 is a fragmentary, vertical sectional view in diagrammatic form, illustrating the control means I employ and showing the same in its operational relationship with the upper portion of the cylinder block of a conventional internal combustion engine.

Referring more particularly to the disclosure in the drawings, the numeral 10 designates the conventional combustion chamber of an L-head motor. Such a motor normally will have the cylinder walls 12, the pistons 14, and the associated parts to connect the same to the crank shaft of the engine, and at least one each of the usual intake valves 16 and exhaust valves for each cylinder. These valves are disposed in the usual manner, the intake valve, shown, being joined to a manifold, in common with the intake valves of other cylinders, to which in turn is connected a conventional carburetion means. The exhaust valves not shown are likewise connected to the exhaust manifold in the usual manner. It will follow that my control means can be adapted to any conventional type of internal combustion engine even to the overhead valve type. However, for simplicity of showing, the L-type of motor is illustrated in Figures 2 and 6.

Adapted to communicate with combustion chamber 10 is the auxiliary chamber 18. The connection between chambers 18 and 10 is controlled by valve 20. As illustrated in Figures 2 and 6, valve 20 is seated in its lower position so that the combustion chamber 10 is smaller in cubic capacity than that as normally supplied by the maker of the motors. When however conditions indicate that compression pressures would be so high as to create dangerous pressures or to create detonations or diesel cycling operations, valve 20 is raised so that it seats on the upper seat 22 and thus chamber 18 becomes in effect a part of combustion chamber 10 and increases the volumetric capacity of the combustion chamber to substantially the capacity supplied by the manufacturer of conventional engines.

It is to be noted that compression spring 24 is so disposed as to normally seat valve 20 on the upper seat 22. Thus if the control means became inoperative, or a part of the same failed in operation, the effect would be to have the auxiliary chamber 18 at all times connected with chamber 10. This would insure against extreme peak compression pressures and while the thermal efficiency during the closed or partially closed throttle condition would be substantially reduced, it would be only during the emergency period until repair could be made. This is considered a factor adding to the safety of operation and a desirable one.

Figure 2:
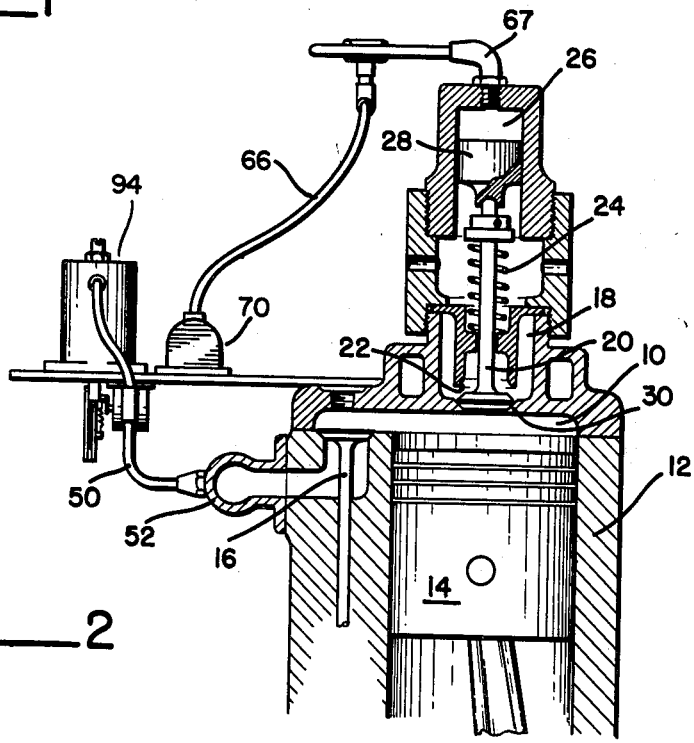
Figure 2 is a typical, cross-sectional view, in elevation, showing one of the cylinders of an internal combustion engine with my preferred form of control means applied thereto.

Referring to Figures 2 and 6, two different forms of pressure means have been provided for the positioning of valve 20. In Figure 2 which is the preferred form, fluid under pressure is led into cylinder 26 which forces piston 28 downward thus seating valve 20 on its lower seat 30. It therefore follows that when pressure is reduced in cylinder 26, then compression spring 24 operates to raise valve 20 to its upper seat 22. A similar mode of operation occurs in the mechanical application in Figure 6. In this instance cap member 40 is revolved by means of lever 42 and the mechanism shown in Figure 5 upon threads 43 and this presses valve 20 down into the lower seating position as illustrated. When, however, lever 42 is rotated in the opposite direction about the vertical axis of valve 20, pressure member 44 is retracted and spring 24 functions as in the other form to raise valve 20 and seat it on the upper seat 22. Screw 41 serves to engage the interlock device.

A satisfactory working arrangement for the fluid pressure mode of operation is illustrated in Figures 1 through 4. In this arrangement, a fluid line 50 is in free communication with the intake manifold 52. This negative pressure, passing through line 54, communicates with a vacuum cylinder 56. This cylinder is provided with a piston 57 and a restoring spring for the same is provided at 58. By means of the pivoted lever 60, piston 57 is connected to a smaller piston 62 disposed for reciprocation within a preferably oil cylinder 64. It is to be noted that considerable mechanical advantage is desirable between pistons 57 and 62 and further the diameters of these two cylinders should be arranged so that considerably higher pressure is provided on the oil line than is available in the vacuum lines.

The oil, under pressure, is conveyed by tubes 66 to each of the cylinder-fittings 67. This same pressure line has a branch in free communication with control cylinder 70. Cylinder 70 and its associated piston and return spring operate the cam rod 72 which in turn is capable of preventing the opening of the butterfly valve assembly 74 of carburetor 76 at a time when excess compression pressures could be developed.

Vacuum line 54 is provided with two control valves as 80 and 82. The construction of these valves is best illustrated in Figure 4 in which a housing member 84 is provided in which is positioned, for rotary movement, the rotary valve member 85. This rotor is in turn controlled by an external lever 87 for valve 80 and a control lever 88 for valve 82. Valve 80 is controlled by the operator as he moves the throttle control rod 90. This is effected by an auxiliary control rod 91 which is connected between lever 87 and rod 90 by the adjustable coupling member 92.

Valve 82, which also serves to control vacuum line 50, is operated by negative pressure taken from this line. A convenient means is illustrated in Figure 1 in which a vacuum cylinder 94 is provided having a reciprocal piston 96 which in turn is suitably connected to lever 88 and thus controls the rotor 85 of this valve. The vacuum pressure cylinder 94 is under control of two valves, a check valve 98 and an adjustable shut-off valve 99. Check valve 98 permits negative pressure to be released from cylinder 94 when the throttle is opened. Shut-off valve 99 is capable of manual adjustment to the end that the time required for a change in pressure to effect piston 96 can be pre-determined and this provides a means which in effect holds this entire control mechanism inoperative or non-responsive to momentary changes of pressure which might be occasioned by the operation of the throttle or by sudden change in loads as often occurs in changing gear speeds. It is desired to point out that this is an important adjustment in that it makes it possible for the control means to be adjusted so that it will come into use during those periods when there is real need for it and it will be out of use and in no way interfering with the output of the motor during periods of intermittent use where the power requirements may have a considerable range of variation.

For certain types of engines that are under the direct control of a competent engineer, such as marine and stationary engines, it has been found desirable to employ the final mechanical application of effort as illustrated in Figures 5 and 6. In this construction the plurality of levers 42 is connected together by links as 100 and this linkage is in turn, adapted to be operated as by vacuum piston 102, under urgence of negative pressure within cylinder 104, as may be supplied by a line joined to fitting 106. A compression spring 107 is employed to restore the piston to its outward position, relying upon suction or negative pressure to move it into the cylinder. The opposite end of linkage 100 may be connected to any suitable manual control so that the final positioning of valve 20 will be directly under the manual control of the attendant engineer. Screw 41, threaded into one of the arms 42, is adjustably positioned to interlock valve assembly 74 in a manner similar to the action of cam rod 72. Valves 80, 82 are the same in this assembly as with the hydraulically operated stop 70.

*Method of operation*

In order to attain the highest level of thermal efficiency throughout the range of operation of the internal combustion motor, it has been found desirable to have the compression pressure as high as can be achieved without detonation or dangerous explosions within the cylinder. Detonations when they occur provide such excess pressures that they are very detrimental to the bearing surfaces of the reciprocating parts and place unusual strain and stresses on the various parts. Consequently unusual means have been employed in the past to endeavor to prevent such occurrences. The more commonly recognized means is by the employment of high octane fuels, and where the load is constant, as in aviation motors and marine motors, this serves the end under a given set of operating conditions. Automotive equipment and many industrial uses require that internal combustion engines must be capable of delivering a power output to meet the needs. At times a very small percentage of the motor capacity may be employed, while at other times, it may be desirable to employ the full power of the motor. In its present arrangement, when my control means is inoperative, the motor will function in the same manner as normal present type motors. When my control means is operative causing the valve 20 to be in the position that seals off the auxiliary chamber 18, the motor will function with a high compression pressure during partial load or near no load conditions. However, when this control equipment is employed under full load or near full load, the throttle must be depressed to admit more fuel into the cylinders and this substantially lowers the vacuum within the intake manifold 52. Under these conditions if a full charge of fuel is taken into the cylinders together with the associated air for combustion, detonation would probably occur due to the high compression pressure employed to gain high thermal efficiency. However, because of the interlock cylinder 70 and its associated cam rod 72, a downward thrust on the throttle rod 90 serves only to operate valve 80 and compress the carburetor spring 100. When sufficient pressure is removed from cylinders 26 valves 20 will be raised, opening the passage between chambers 10 and 18 and thus reducing the compression pressure. Simultaneously the pressure is removed from cylinder 70, retracting cam rod 72 and permitting the throttle to be opened as desired. The adjusting screw 75 is adjustably secured to a lip formed as part of lever 74 and is set in the position such that it will have no effect on the free movement of the throttle valve for small variations at the partial load or near no load condition. The adjusting screw 75 is set in the position such that it stops the throttle valve from opening any further when the throttle valve reaches the position where further opening will cause excessive compression pressure in the engine.

By means of the partially opened shut-off valve 99 my control means is kept inoperative for a limited time interval, allowing rapidly changing vacuum pressures in the manifold to take place such as during conditions met in city driving, without actuating my control equipment. However when this control equipment is employed on the open road where steady conditions of high vacuum in the intake manifold are present, this control means will operate to maintain higher compression pressures than are now present in the conventional engine under the same conditions and will thus make the engine operate at a higher thermal efficiency. When full load conditions are required, the throttle must be depressed. When valve 80 is operated by rod 91 at the time the operator is increasing the output capacity of the engine, valve 80 closes off the vacuum line 50 and by means of the three-way ports throws the vacuum line 54 open to the outside atmosphere. The pressure is then removed from cylinders 64 and 70 and cylinders 26, valves 20 will be raised and cam rod 72 will be retracted permitting full throttle conditions. When varying vacuum conditions exist in the manifold other than that due to a rapid movement of the throttle control rod 90, vacuum cylinder 94 operates. Vacuum cylinder 94 operates on a reduced vacuum in the intake manifold by gas entering through the check valve 98 into cylinder 94 causing the valve 82 to close off the vacuum line 50 and by means of the three-way ports to throw vacuum line 54 open to the outside atmosphere.

It is believed that it will be clearly apparent from the above description and the disclosure in the drawings that the invention comprehends a novel construction of a means for changing the cubical contents of the combustion chambers of an internal combustion engine.

Having thus disclosed the invention, I claim:

1. The combination with an internal combustion engine, having a throttle, a carburetor valve, and an intake manifold, of means permitting varying of the size of the combustion chambers between a larger and a smaller volume; hydraulic control means operative to reduce said chambers under moderate throttle conditions to the smaller volume and being operative to enlarge said chambers under full throttle conditions to the larger volume, said hydraulic control means having a control line leading to the intake manifold of said engine and said hydraulic control means being controlled in its action by the vacuum conditions in said intake manifold; interlock means including a hydraulically operated stop connected to said hydraulic control means so as to be responsive to the same fluid pressures and stopping opening of the carburetor valve of said engine from moderate to full throttle until said hydraulic control means enlarges said chambers, said interlock means including valve means in said control line responsive to movement of the throttle from moderate to full operative condition to immediately disconnect said hydraulic control means from influence of the intake manifold pressures and opening said hydraulic control means to the atmosphere permitting enlargement of said chambers; and time-delay means including a control valve operative to block said hydraulic control means from influence of further changes in the intake manifold pressures so as to maintain the setting of said hydraulic control means in its condition at the time of operation of the control valve, said time-delay means including a piston and a cylinder having a line connecting the same to the intake manifold of said engine and said piston being connected to said control valve to normally hold said control valve open when said piston is held in a retracted position by vacuum in said intake manifold and to normally hold said control valve in said blocking relation to said hydraulic control means when said piston is permitted to assume an expanded position in absence of vacuum in said intake manifold and adjustable valve means in said line restricting passage of air therethrough in change from full to moderate throttle, whereby said hydraulic control means will not reduce the chambers in change from full to moderate throttle of short duration within time limits pre-set through said adjustable valve means.

2. The combination with an internal combustion engine, having a throttle, a carburetor valve, and an intake manifold, of means permitting varying of the size of the combustion chambers between a larger and a smaller volume; hydraulic control means under the control of the intake manifold pressure of the engine operative to enlarge said chambers under full throttle conditions to the larger volume and operative to reduce said chambers under moderate throttle conditions to the smaller volume; interlock means including a hydraulically operated stop connected to said hydraulic control means so as to be responsive to the same fluid pressures and stopping opening of the carburetor valve of said engine from moderate to full throttle until said hydraulic control means has so enlarged said chamber and means responsive to movement of the throttle from moderate to full operative to immediately initiate said hydraulic control means to enlarge said chambers; and time-delay means including a control valve operative to block said hydraulic control means from influence of further changes in the intake manifold pressures so as to maintain the setting of said hydraulic control means in its condition at the time of operation of the control valve, said time-delay means operating said control valve to so block said hydraulic control means for a pre-set time in response to change in manifold pressures incident to change from full to moderate throttle.

3. The combination with an internal combustion engine, having a throttle, a carburetor valve, and an intake manifold, of means permitting varying of the size of the combustion chambers between a larger and a smaller volume; hydraulic control means including spring means normally holding said first-mentioned means in its position of larger volume, said hydraulic control means being operative to reduce said chambers under moderate throttle conditions to the smaller volume and being operative to permit enlargement of said chambers by said spring means under full throttle conditions to the larger volume, said hydraulic control means having a control line leading to the intake manifold of said engine and said hydraulic control means being controlled in its action by the vacuum conditions in said intake manifold; and interlock means including a hydraulically operated stop connected to said hydraulic control means so as to be responsive to the same fluid pressures and stopping opening of the carburetor valve of said engine from moderate to full throttle until said hydraulic control means permits enlargement of said chambers by said spring means, said interlock means including valve means in said control line responsive to movement of the throttle from moderate to full operative to immediately disconnect said hydraulic control means from influence of the intake manifold pressures and opening said hydraulic control means to the atmosphere permitting said spring means to enlarge said chambers.

4. The combination with an internal combustion engine, having a throttle and an intake manifold, of means permitting varying of the size of the combustion chambers between a larger and a smaller volume; control means connected to the intake manifold of said engine, said control means being under the control of the intake manifold pressure of the engine and being operative to enlarge said chambers under full throttle conditions to the larger volume and operative to reduce said chambers under moderate throttle conditions to the smaller volume; and time-delay means including a control valve operative to block said control means from influence of further changes in the intake manifold pressures so as to maintain the setting of said control means in its condition at the time of operation of the control valve, said time-delay means including a piston and a cylinder having a line connecting the same to the intake manifold of said engine and said piston being connected to said control valve to normally hold said control valve open when said piston is held in a retracted position by vacuum in said intake manifold and to normally hold said control valve in said blocking relation to said control means when said piston is permitted to assume an expanded position in absence of vacuum in said intake manifold and adjustable valve means in said line restricting passage of air therethrough in change from full to moderate throttle, whereby said control means will not reduce the chambers in change from full to moderate throttle of short duration within time limits pre-set through said adjustable valve means.

5. The combination with an internal combustion engine, having a throttle, a carburetor valve, and an intake manifold, of means permitting varying of the size of the combustion chambers between a larger and a smaller volume; control means under the control of the intake manifold pressure of the engine operative to enlarge said chambers under full throttle conditions to the larger volume and operative to reduce said chambers under moderate throttle conditions to the smaller volume; interlock means operative to delay response of the carburetor valve of said engine to change from moderate to full throttle until said control means has so enlarged said chambers; and time-delay means operative to delay for a pre-set time the action of said control means to reduce said chambers to the smaller volume in response to change in manifold pressures incident to change from full to moderate throttle.

6. The combination with an internal combustion engine, having a carburetor valve and a throttle, of means permitting varying of the size of the combustion chambers between a larger and a smaller volume; hydraulic control means operative to enlarge said chambers under full throttle conditions to the larger volume and operative to reduce said chambers under moderate throttle conditions to the smaller volume; and interlock means including a hydraulically operated stop connected to said hydraulic control means so as to be responsive to the same fluid pressures and stopping opening of the carburetor valve of said engine from moderate to full throttle until said hydraulic control means has so enlarged said chamber and means responsive to movement of the throttle from moderate to full operative to immediately initiate said hydraulic control means to enlarge said chambers.

7. The combination with an internal combustion engine, having a throttle and an intake manifold, of means permitting varying of the size of the combustion chambers between a larger and a smaller volume; control means connected to the intake manifold of said engine, said control means being under the control of the intake manifold pressure of the engine and being operative to enlarge said chambers under full throttle conditions to the larger volume and operative to reduce said chambers under moderate throttle conditions to the smaller volume; and time-delay means including a control valve operative to block said control means from influence of further changes in the intake manifold pressures so as to maintain the setting of said control means in its condition at the time of operation of the control valve, said time-delay means operating said control valve to so block said control means for a pre-set time in response to change in manifold pressures incident to change from full to moderate throttle.

8. The combination with an internal combustion engine, having a throttle, a carburetor valve, and an intake manifold, of means permitting varying of the size of the combustion chambers between a larger and a smaller volume; control means under the control of the intake manifold pressure of the engine operative to enlarge said chambers under full throttle conditions to the larger volume and operative to reduce said chambers under moderate throttle conditions to the smaller volume; and interlock means operative to delay response of the carburetor valve of said engine to change from moderate to full throttle until said control means has so enlarged said chambers.

9. In an internal combustion engine of the type having a carburetor and having a combustion chamber and an intake manifold connected to said combustion chamber, the improvement, comprising: an auxiliary chamber formed on the engine adjacent to the combustion chamber and having a passageway leading from the auxiliary chamber to the combustion chamber, a passageway valve having a closed position in which it closes said passageway and having an open position in which the passageway is open, control means for positioning said passageway valve, said control means being connected to said intake manifold, said control means including a control valve operative at conditions between no vacuum and up to a predetermined degree of vacuum in the intake manifold to vent the control means to atmospheric pressure and said control means moving said passageway valve to the open position when so vented to atmospheric pressure, said control means being operative at conditions above said predetermined degree of vacuum in the intake manifold to move said passageway valve to said closed position, and time delay inactivating means operative to delay for a pre-set time the action of said control means to move said passageway valve to said closed position in response to a change in conditions in said intake manifold from below to above said predetermined degree of vacuum by maintaining said control valve for said pre-set time in position venting said control means to atmospheric pressure.

References Cited in the file of this patent

UNITED STATES PATENTS

| | | |
|---|---|---|
| 2,040,652 | Gaty | May 12, 1936 |
| 2,094,266 | Du Bois | Sept. 28, 1937 |
| 2,120,012 | Andreau | June 7, 1938 |
| 2,120,290 | Meyer | June 14, 1938 |
| 2,145,017 | Tsuneda | Jan. 24, 1939 |